(12) United States Patent
Litzenberg et al.

(10) Patent No.: US 7,790,097 B2
(45) Date of Patent: Sep. 7, 2010

(54) METHOD AND DEVICE FOR BLOW FORMING CONTAINERS

(75) Inventors: Michael Litzenberg, Geesthacht (DE);
Michael Linke, Ahrensburg (DE);
Frank Berger, Barsbüttel (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 476 days.

(21) Appl. No.: 11/662,748

(22) PCT Filed: Jul. 26, 2005

(86) PCT No.: PCT/DE2005/001315

§ 371 (c)(1),
(2), (4) Date: Sep. 24, 2007

(87) PCT Pub. No.: WO2006/029584

PCT Pub. Date: Mar. 23, 2006

(65) Prior Publication Data

US 2008/0128958 A1    Jun. 5, 2008

(30) Foreign Application Priority Data

Sep. 14, 2004    (DE) .................. 10 2004 044 260

(51) Int. Cl.
*B29C 49/12* (2006.01)
*B29C 49/58* (2006.01)
*B29C 49/62* (2006.01)

(52) U.S. Cl. .................. 264/531; 264/532; 425/529; 425/535; 425/540

(58) Field of Classification Search .................. None
See application file for complete search history.

(56) References Cited

U.S. PATENT DOCUMENTS 4,488,863 A    12/1984    Collette et al.

(Continued)

FOREIGN PATENT DOCUMENTS

DE    23 52 926    4/1975

(Continued)

OTHER PUBLICATIONS

Patent Abstracts of Japan, BD. 018, No. 115 (M-1566), Feb. 24, 1994 & JP 05 309726 A (Hirokazu Yoshioka), Nov. 21, 2001.

*Primary Examiner*—Monica A Huson
(74) *Attorney, Agent, or Firm*—Lucas & Mercanti, LLP; Klaus P. Stoffel

(57) ABSTRACT

The method and device are used to blow form containers. A preform is elongated by means of an elongation bar after thermal conditioning inside a blow mould and is moulded into a container under the effect of the blow pressure. Initially, a first blow pressure provided by a low pressure supply is used, followed by a higher pressure provided by a high pressure supply (43). The blow air is supplied via at least one blow pressure valve and at least one part of the high pressure blow air is fed into the low pressure supply after the container has been formed. The reintroduction of blow air into the low pressure supply is controlled by means of a return valve (47) which is mounted parallel to the blow pressure valve. An outlet of the return valve is connected to the low pressure supply.

20 Claims, 8 Drawing Sheets

U.S. PATENT DOCUMENTS 5,648,026 A * 7/1997 Weiss ..................... 264/37.16
5,817,348 A * 10/1998 Ikeda ......................... 425/529
2004/0173949 A1   9/2004 Storione et al.

FOREIGN PATENT DOCUMENTS

| | | |
|---|---|---|
| DE | 31 11 925 | 10/1982 |
| DE | 42 12 583 | 10/1993 |
| DE | 42 40 291 | 6/1994 |
| DE | 43 40 291 | 6/1995 |
| DE | 199 06 438 | 8/2000 |
| DE | 102004041973 | 1/2006 |
| EP | 1 155 808 | 11/2001 |
| WO | 03/009993 | 2/2003 |

* cited by examiner

METHOD AND DEVICE FOR BLOW FORMING CONTAINERS

The invention concerns a method for blow molding containers, in which a preform is stretched inside a blow mold by a stretch rod after thermal conditioning and blow molded into the container by the action of blowing pressure, and in which a first blowing pressure supplied by a low-pressure supply system is used first, and then a second, higher blowing pressure supplied by a high-pressure supply system is used, and the blowing air is supplied through at least one blowing air valve, and in which, after a container has been blow molded, at least a portion of the high-pressure blowing air is fed into the low-pressure supply system.

The invention also concerns a device for blow molding containers, which has at least one blowing station with a blow mold and at least one stretch rod, and in which the blowing station is connected to both a low-pressure supply system for supplying a first blowing pressure and to a high-pressure supply system for supplying a second blowing pressure that is higher than the first blowing pressure, and in which, after a container has been blow molded, a blowing air return line is used to feed high-pressure blowing air flowing from the blowing station into the low-pressure supply system.

In container molding by the action of blowing pressure, preforms made of thermoplastic material, for example, preforms made of PET (polyethylene terephthalate), are fed to different processing stations within a blow-molding machine. Typically, a blow-molding machine of this type has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs involve the use of gripping tongs for handling the preforms and the use of expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

The return of used blowing air from a high-pressure zone to a low-pressure zone is already described in U.S. Pat. No. 4,488,863 A. Equipment for realizing multiple use of blowing air is explained in DE 43 40 291 A1.

The previously known methods and devices are not yet sufficiently well suited for optimizing the return of blowing air in a way that guarantees the greatest possible amount of blowing air returned and at the same time avoids an impermissible increase in pressure in the low-pressure zone.

Therefore, the objective of the invention is to improve a method of the aforementioned type in such a way that the greatest possible amount of blowing air is returned within an acceptable pressure range.

In accordance with the invention, this objective is achieved by controlling the return of blowing air to the low-pressure supply system by a return valve connected in parallel with the blowing pressure valve and by connecting a valve outlet of the return valve with the low-pressure supply system.

A further objective of the present invention is to design a device of the aforementioned type in a way that serves to optimize the return of blowing air.

In accordance with the invention, this objective is achieved by providing the blowing air return system with a return valve, which is located in a return branch that runs parallel to a blowing pressure valve, and by connecting a valve outlet of the return valve to the low-pressure supply system.

The use of a return valve placed in a separate return branch makes it possible to realize the blowing air return system independently of a circuit of the blowing pressure valve, with the blowing air valve preferably being used to supply the low-pressure blowing air. In particular, this use of a separate return valve helps realize pressure limitation in the low-pressure zone without it being necessary to blow off compressed air to avoid an impermissible increase in pressure.

To predetermine a direction of flow in the return branch exclusively from the blowing station towards the low-pressure supply system, it is proposed that the return valve be connected in series with a check valve.

Measuring the pressure in the low-pressure supply system helps optimize the return of blowing air.

In particular, it has been found to be advantageous to control at least one of the valves as a function of the measured pressure.

A typical high-pressure level is realized by supplying a pressure of about 40 bars in the high-pressure supply system.

To carry out a preblowing phase, it was found to be effective to supply a pressure of about 20 bars in the low-pressure supply system.

Further optimization of the blowing air return can be realized if at least a portion of the compressed air in the low-pressure supply system can be returned under controlled conditions to a plant air system.

In a typical embodiment, it is proposed that a pressure of about 10 bars be supplied in the plant air system.

In another embodiment for optimizing the return of compressed air, at least a portion of the compressed air from the low-pressure zone is returned under controlled conditions as admission pressure to a high-pressure compressor.

The pressure level can be evened out by using a volume reservoir for the low-pressure air.

Specific embodiments of the invention are illustrated in the accompanying schematic drawings.

Figure 1:
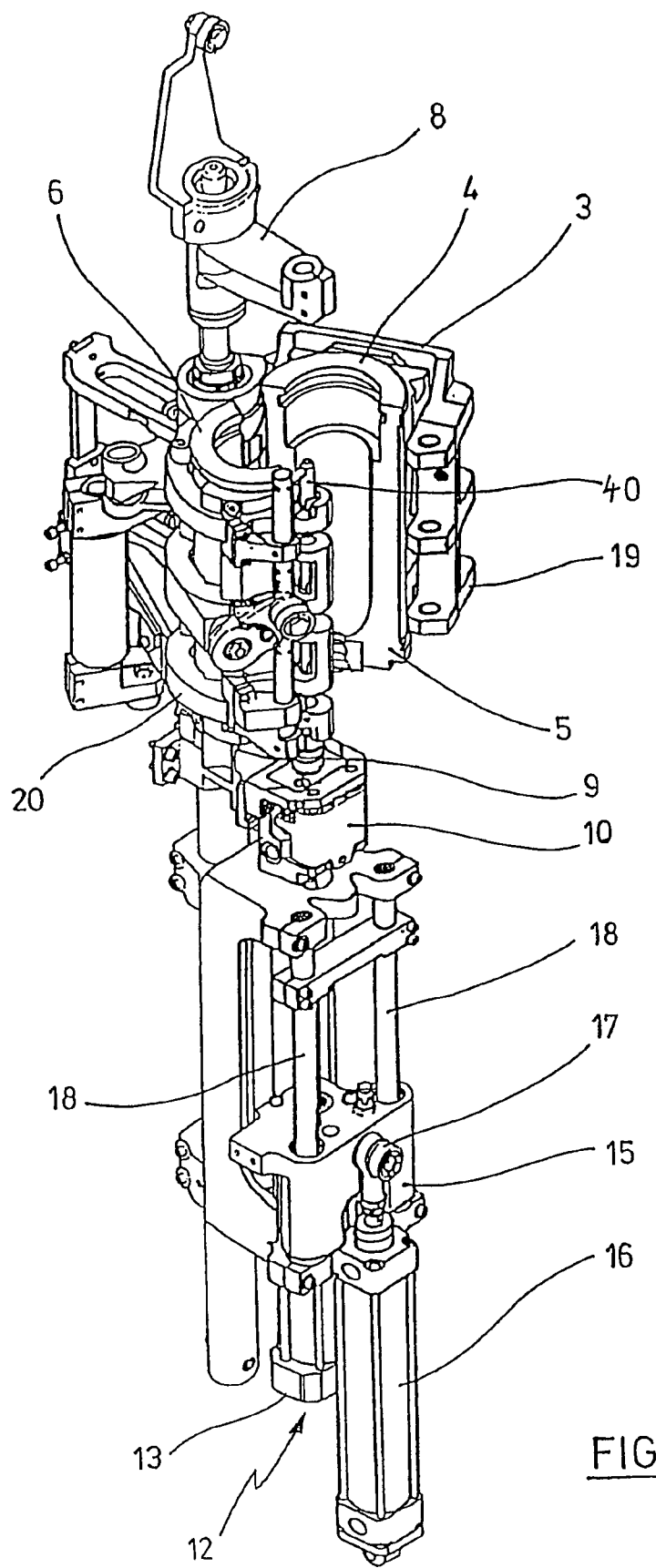
FIG. 1 is a perspective view of a blowing station for producing containers from preforms.
Figure 2:
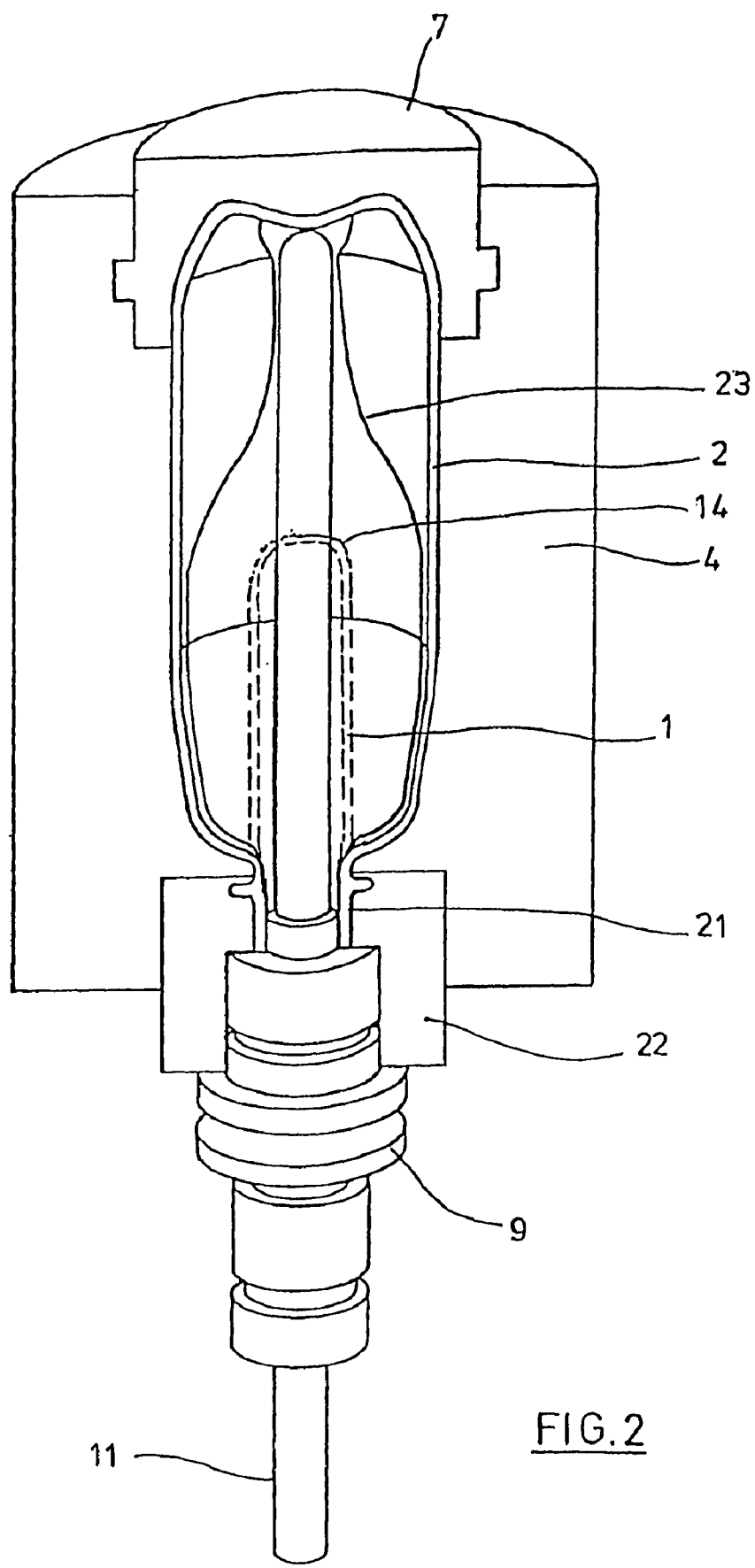
FIG. 2 is a longitudinal section through a blow mold, in which a preform is stretched and expanded.

FIGS. 1 and 2 show the basic design of a device for blow molding preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a large number of treatment stations. However, it is also possible to insert the preform 1 directly into the blow mold 4, for example, with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
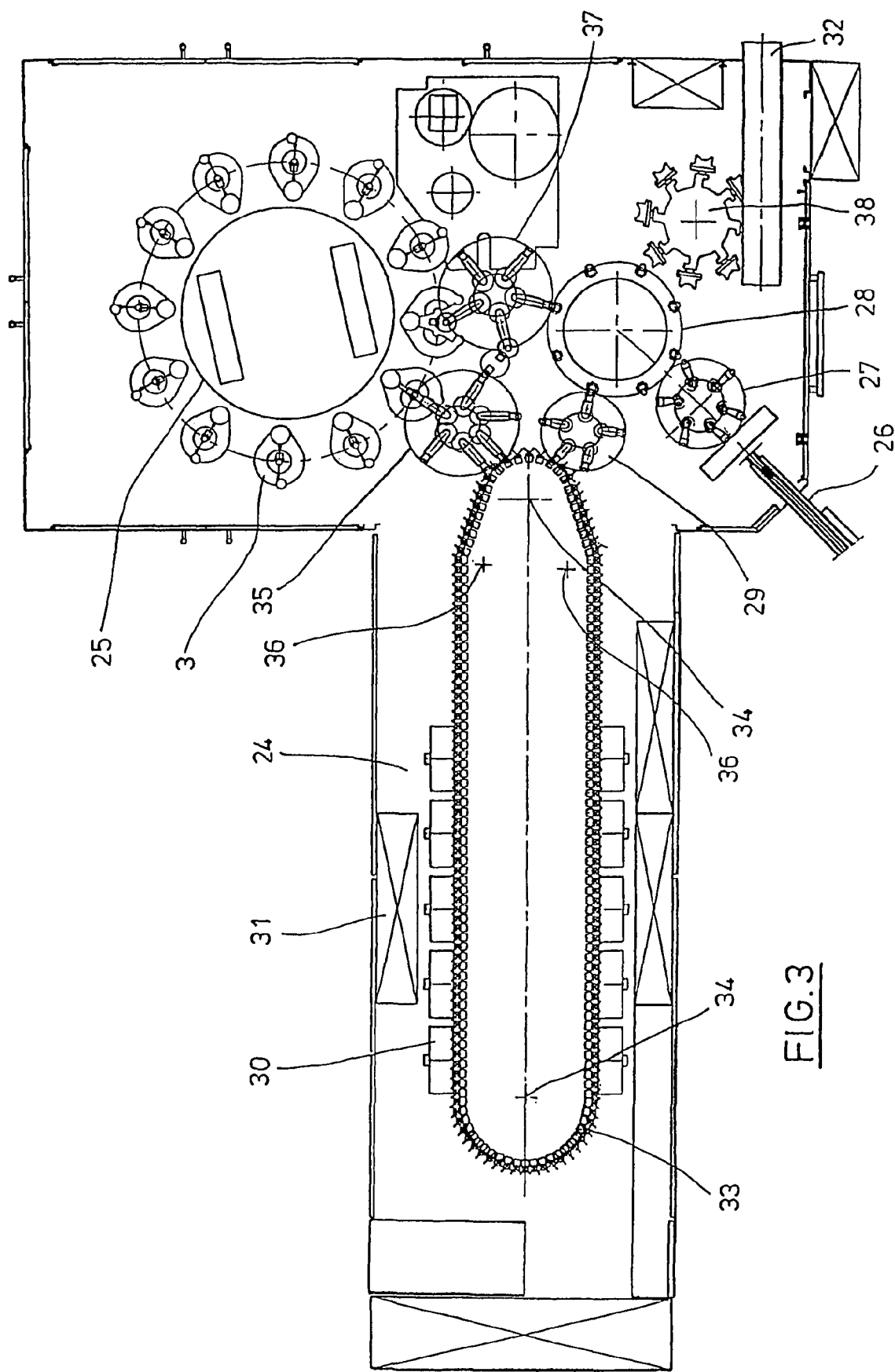
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that, in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the expansion of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding expansion of the heating line 24, namely, the smaller guide wheels 36 in the area of the transition to the linear stretches of the heating line 24 and the larger guide wheel 34 in the immediate area of transfer to the transfer wheel 29 and transfer to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
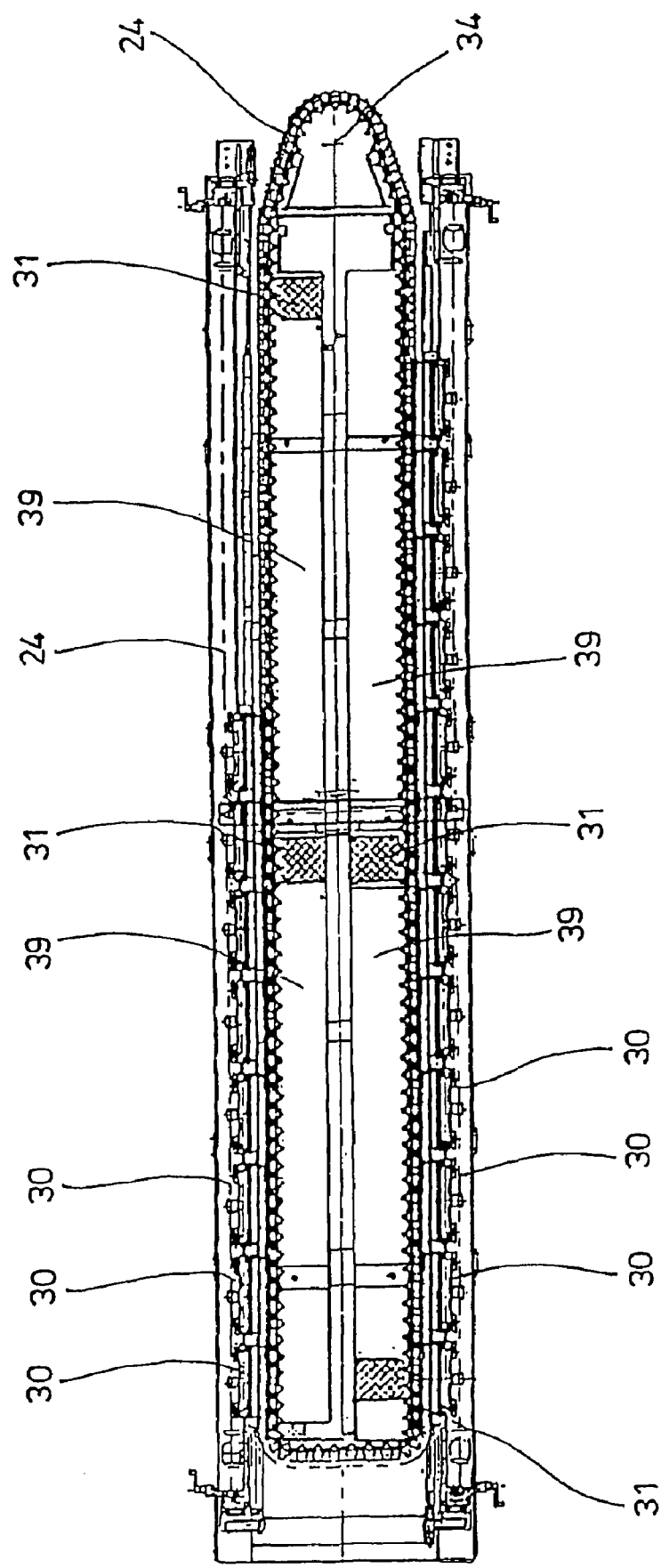
FIG. 4 is a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
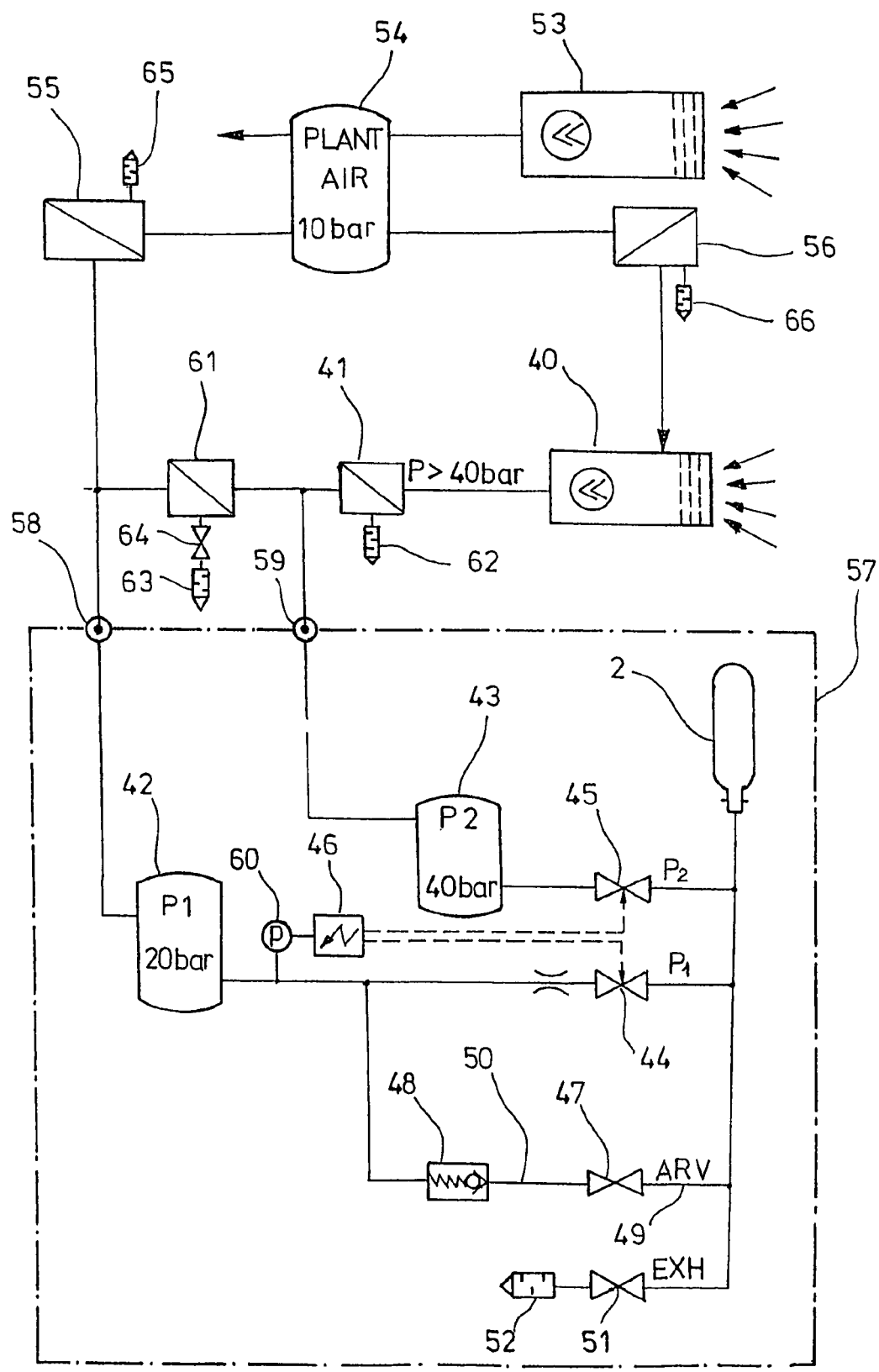
FIG. 5 is a block diagram that illustrates the pneumatic functional components in the blowing air return system.

FIG. 5 shows a schematic block diagram of the compressed air supply. The container 2 that is drawn in the diagram simultaneously represents the preform 1 and the container bubble 23. Pressure at a delivery pressure level, for example, above 40 bars, is produced by a high-pressure compressor 40. In the illustrated embodiment, a pressure reduction to two different supply pressure levels is effected by one or more pressure converters 41, 61. The higher pressure level here is about 40 bars, and the lower pressure level is about 20 bars. The pressure converters 41, 61 are designed as reducing distribution stations and are provided with sound absorbers 62, 63 for compressed air discharged to the environment. The sound absorber 63 is connected with the pressure converter 61 by an air vent valve 64.

Reserve volumes for each pressure are made available by tanks 42, 43, so that even in the case of timed delivery of pressurized gas, the given pressure level is at least approximately maintained. Valves 44, 45 are used for the controlled supply of pressurized gas. The valves 44, 45 are connected to a control unit 46, which coordinates the given switching times of the valves 44, 45.

A return valve 47, which is connected in series with a check valve 48, is arranged parallel to the valve 44 for supplying the low blowing pressure. A valve inlet 49 of the return valve 47 is connected with the blowing station 3, and a valve outlet 50 of the return valve 47 is connected to the check valve 48. The check valve 48 allows flow from the blowing station 3 through the return valve 47 in the direction of the low-pressure supply. To vent the inside of the container 2 to the environment, an air vent valve 51 is used, which is coupled with a sound absorber 52. Preferably, the controllable valves 47, 51 are also connected to the control unit 46.

In an expanded embodiment of the invention, a plant air compressor 53 is additionally used, which supplies plant air in a pressure range of about 10 bars. A plant air tank 54 is used to store the plant air. A control unit 55 makes it possible to convey compressed air from the low-pressure supply system to the plant air supply system after an appropriate pressure reduction. The control unit 55 is designed as a reducing distribution station.

The use of the control unit 55 makes it possible to convey compressed air to the plant air system when a maximum permissible upper pressure level has been reached in the low-pressure supply system. This makes it possible to reduce the operating capacity of the plant air compressor 53.

In accordance with another alternative or supplementary embodiment, it is also possible to connect the plant air tank 54 or the tank 42 for the low-pressure blowing air to the intake of the high-pressure compressor 40 by means of a control unit 56. In this way, the high-pressure compressor 40 would not be supplied with air at ambient pressure but rather air that is already precompressed. This type of operation makes it possible to reduce the operating capacity of the high-pressure compressor 40 and thus to save energy. An advantage of these cascaded design variants is that the total energy requirement for operating the system is reduced. Each of the control units 55, 56 is provided with a sound absorber 65, 66 for venting.

When the compressed air supply system according to FIG. 5 is used for a blowing machine with a rotating blowing wheel 25, the components of the system shown drawn in a mobile zone 57 are installed on the rotating blowing wheel 25, and the other components are installed in a stationary way on the machine foundation. Rotary bushings 58, 59 are used to couple the stationary zone with the mobile zone 57. The rotary bushings 58, 59 can be combined, for example, in the area of a rotary coupling constructed coaxially relative to an axis of rotation.

In a typical process sequence, a valve 44 is opened, and then the container 2 is blow molded with the lower blowing pressure first. Valve 44 is then closed and valve 45 opened, and then the blow molding of the container 2 is completed with the higher blowing pressure. After the container 2 has become sufficiently stable inside the blow mold 4, valve 45 closes, return valve 47 opens, and the blowing air flowing out of the container 2 is returned to the area of the low-pressure supply system. After completion of the recycling process, the air vent valve 51 opens, and the internal pressure in the container 2 is reduced to ambient pressure.

Blowing air flowing back from the area of a blowing station 3 to the area of the low-pressure supply system is used again via the valve 44 in the next blowing station in the process sequence. A pressure distribution that varies within a tolerance range develops in the area of the tank 42 as a function of the amount of air that is recycled and the amount that is consumed. As was described earlier, to optimize the recycled amount and to reduce the range of fluctuation of the pressure in the low-pressure supply system, the compressed air can be conveyed to the plant air supply system, or the recycled amount of air can be used as admission pressure for the high-pressure compressor 40.

In a preferred mode of operation, a pressure sensor 60 can be mounted in the area of the low-pressure supply system and connected to the control unit 46. This allows the control unit 46 to optimize the switching times for the return valve 47 and the air vent valve 51.

Figure 6:
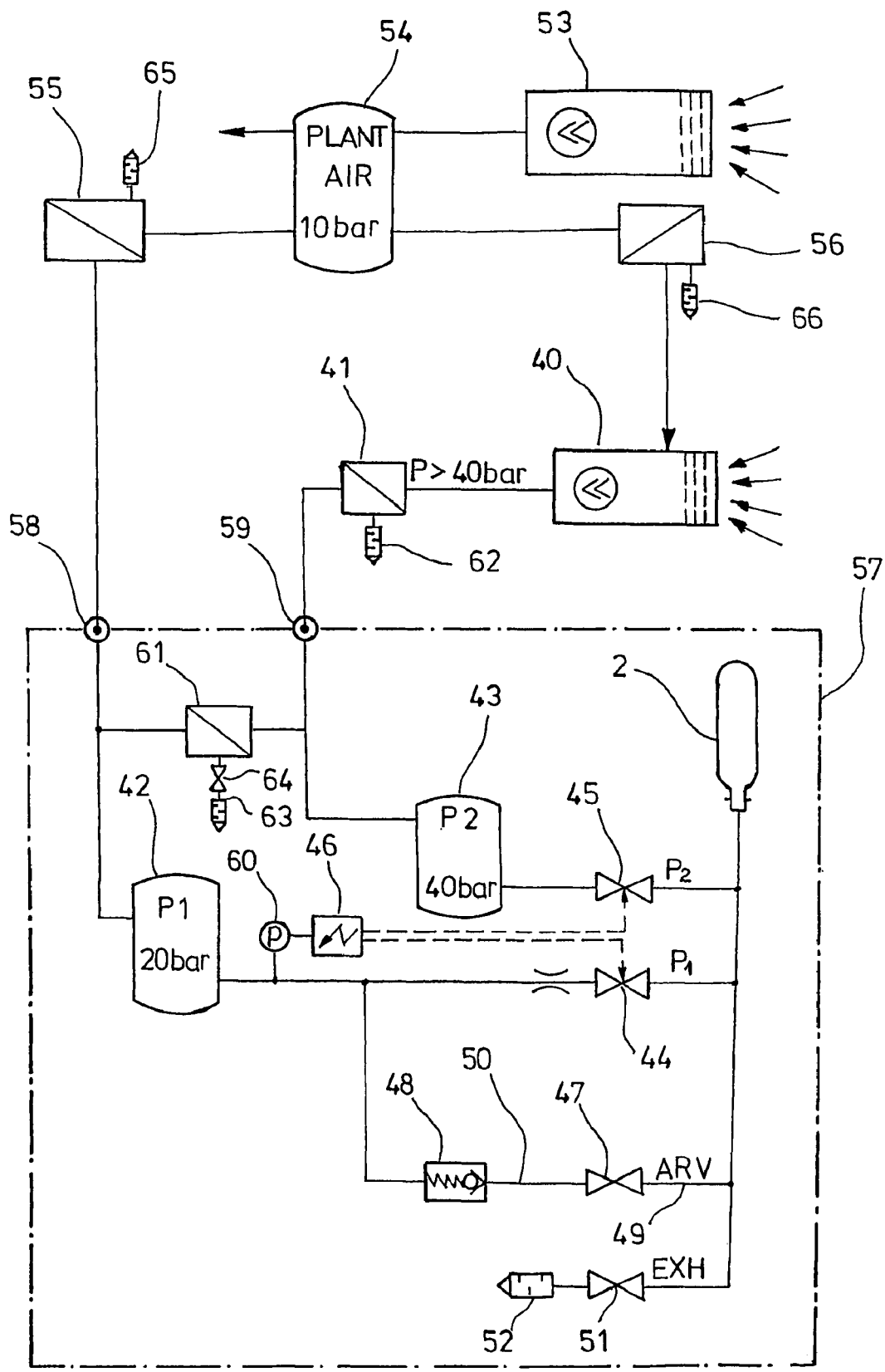
FIG. 6 is a modified embodiment of the system in FIG. 5, in which a reducing distribution station for the lower pressure is mounted on the blowing wheel.

FIG. 6 shows a modified embodiment of the system in FIG. 5. In this case, the pressure converter 61 for the low pressure is not installed in a stationary way outside the mobile zone 57 but rather is installed in the mobile zone 57. The pressure converter 61 is thus installed in the area of the rotating blowing wheel 25. The pressure regulation thus occurs in the local vicinity of the tank 42, which is conducive to more precise pressure regulation.

Figure 7:
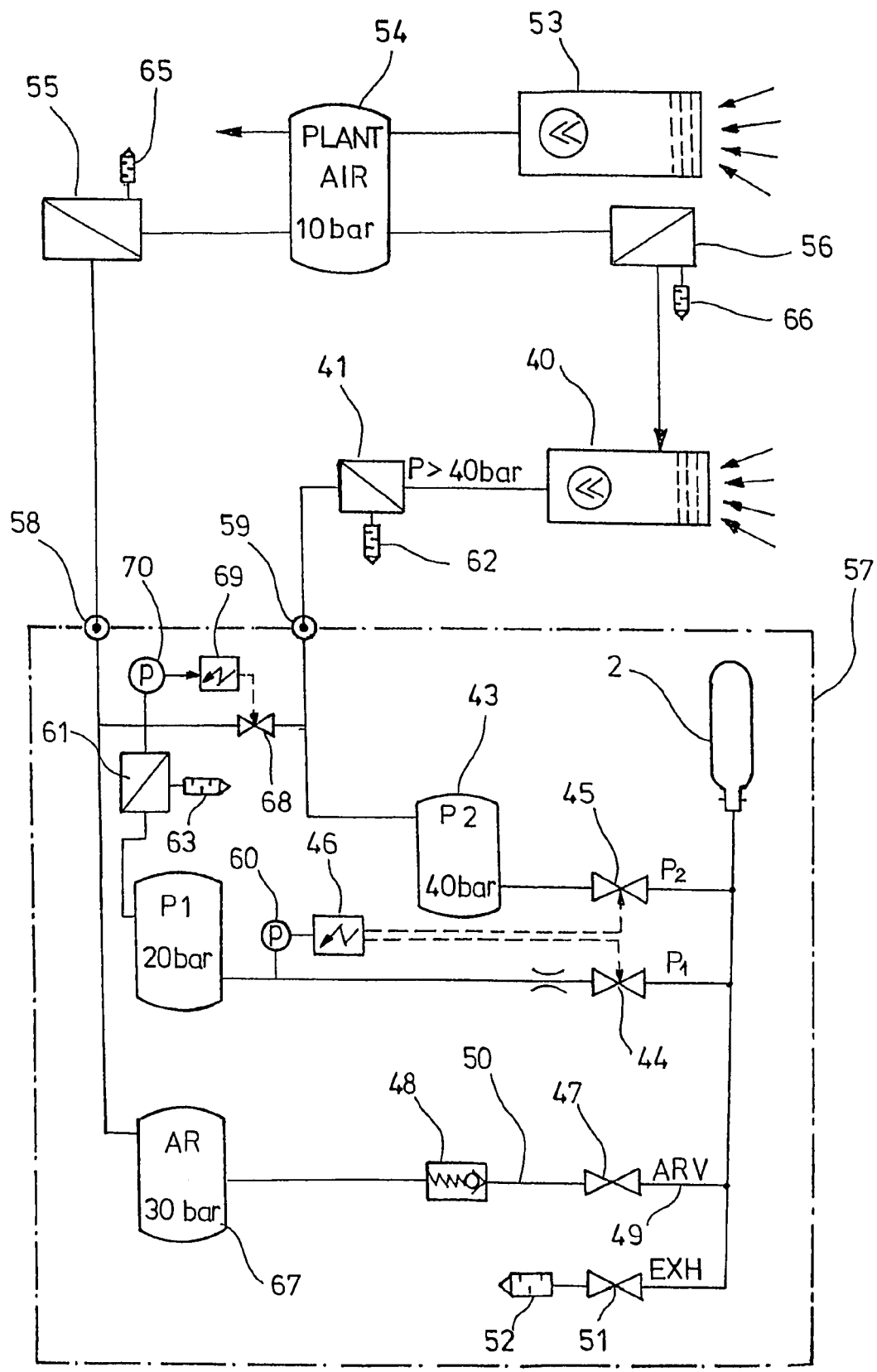
FIG. 7 is a modified embodiment of the system in FIG. 6 with additional control in the area of the reducing distribution station for the lower pressure.

In the embodiment shown in FIG. 7, the compressed air is first returned to an intermediate reservoir 67 via the return valve 47. The intermediate reservoir 67 has a pressure level intermediate between the lower pressure P1 and the higher pressure P2. A typical pressure for the intermediate reservoir 67 is about 30 bars. Moreover, the intermediate reservoir 67 is connected to the rotary bushing 58. In addition, the rotary bushing 58 and the intermediate reservoir 67 have a common connection to the inlet of the pressure converter 61 for the lower pressure. Furthermore, the inlet of the pressure converter 61 is connected with the tank 43 via a check valve 68. The check valve 68 is operated by a control unit 69, to which a pressure sensor 70 is connected, which detects the intake pressure of the pressure converter 61. In both the embodiment shown in FIG. 6 and the embodiment shown in FIG. 7, the only role of the rotary bushing 58 is to carry compressed air away from the mobile zone 57 to the area of the plant air tank 54. In the embodiment shown in FIG. 5, the mobile unit 57 is also supplied with the lower pressure through the rotary bushing 58.

According to the embodiment in FIG. 7, the pressure converter 61 is supplied with compressed air from the intermediate reservoir 67 until a sufficient pressure level is present there. Additional compressed air can be supplied from the high-pressure circuit by the check valve 68. The return of compressed air to the inlet of the pressure converter 61 has the advantage that pressure fluctuations in the area of the tank 42 are minimized.

Figure 8:
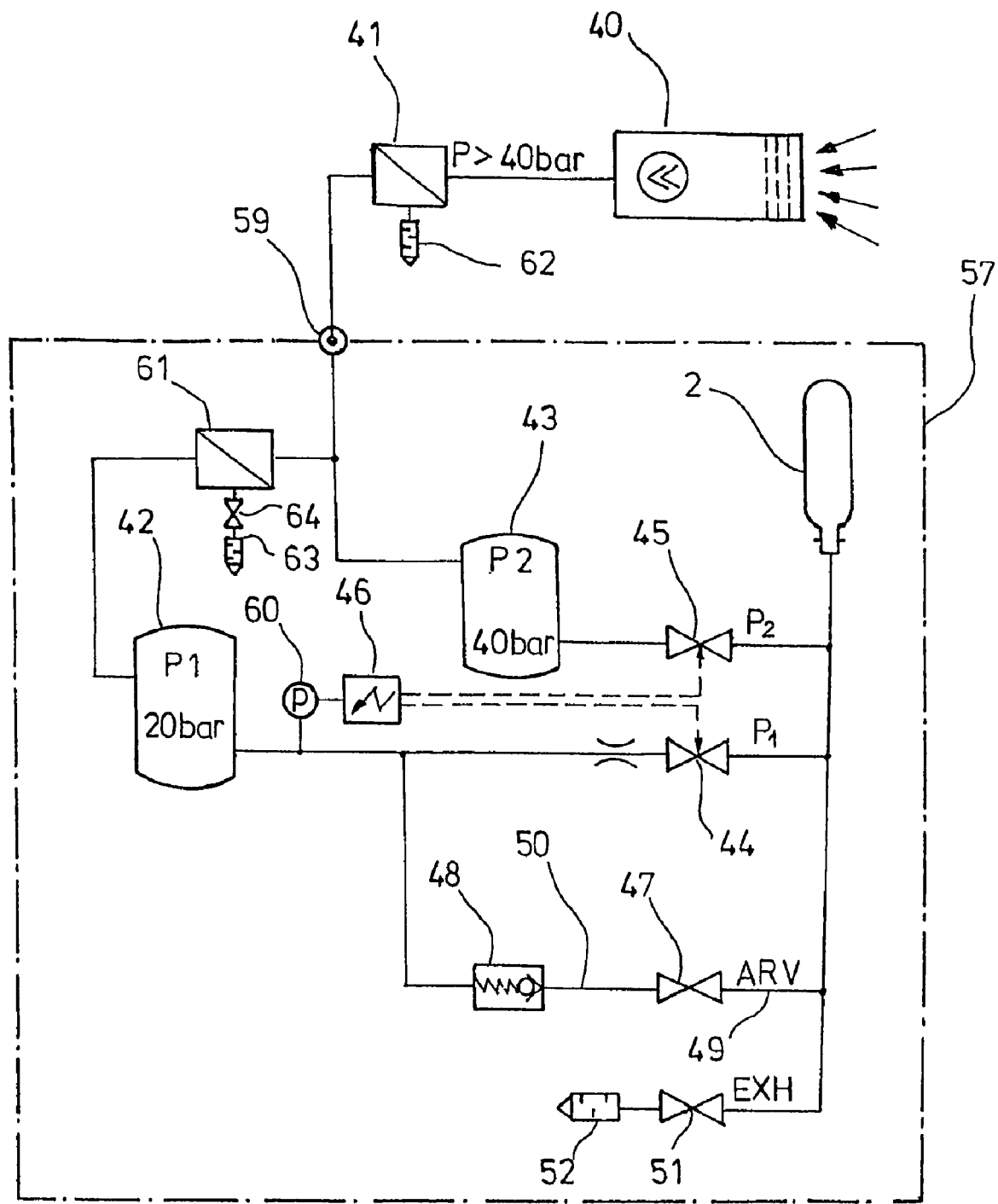
FIG. 8 is another modified embodiment, in which only a high-pressure supply system of the blowing wheel is provided, and the lower pressure is produced by control engineering in the area of the blowing wheel.

In the embodiment illustrated in FIG. 8, the second rotary bushing 58 is dispensed with. The mobile zone 57 is supplied with high pressure only through the rotary bushing 59. All other pressure conversions are carried out inside the mobile zone 57. The return of compressed air that is shown in FIG. 8 is similar to that shown in FIG. 5 and FIG. 6. In principle, however, the return of compressed air to the inlet of the pressure converter 61 as shown in FIG. 7 is also possible in this design variant.

The invention claimed is:

1. A method for blow molding containers, in which a blow mold is arranged on a blowing wheel (25) of a blowing machine, a preform is stretched inside a blow mold by a stretch rod after thermal conditioning and is blow molded into the container by the action of blowing pressure, and in which a first blowing pressure supplied by a low-pressure supply system is used first, and then a second, higher blowing pressure supplied by a high-pressure supply system is used, and the blowing air is supplied through at least one blowing air valve, and in which, after a container has been blow molded, at least a portion of the high-pressure blowing air is fed into the low-pressure supply system, wherein the return of blowing air to the low-pressure supply system is controlled by a return valve (47) connected in parallel with the blowing pressure valve (44, 45) and that a valve outlet (50) of the return valve (47) is connected with the low-pressure supply system, the return valve (47) being connected in parallel with a vent valve (51) and in series with a check valve (48), the return valve (47) also being connected to a rotary bushing (58) via an intermediate reservoir (67), the rotary valve (58) coupling a stationary part of the blowing machine to the blowing wheel (25).

2. A method in accordance with claim 1, wherein the pressure is measured in the area of the low-pressure supply system.

3. A method in accordance with claim 1, wherein at least one of the valves (44, 45, 47) is controlled as a function of the measured pressure.

4. A method in accordance with claim 1, wherein a pressure of about 40 bars is supplied in the high-pressure supply system.

5. A method in accordance with claim 1, wherein a pressure of about 20 bars is supplied in the low-pressure supply system.

6. A method in accordance with claim 1, wherein at least a portion of the compressed air in the low-pressure supply system can be returned under controlled conditions to a plant air system.

7. A method in accordance with claim 1, wherein a pressure of about 10 bars is supplied in the plant air system.

8. A method in accordance with claim 1, wherein at least a portion of the compressed air from the low-pressure zone is returned under controlled conditions as admission pressure to a high-pressure compressor (40).

9. A method in accordance with claim 1, wherein a volume reservoir for the low-pressure air is used.

10. A device for blow molding containers, which has a blow mold is arranged on a blowing wheel (25) of a blowing machine, at least one blowing station with at least one blow mold and at least one stretch rod, and in which the blowing station is connected to both a low-pressure supply system for supplying a first blowing pressure and to a high-pressure supply system for supplying a second blowing pressure that is higher than the first blowing pressure, and in which, after a container has been blow molded, a blowing air return line is used to feed high-pressure blowing air flowing from the blowing station into the low-pressure supply system, wherein the blowing air return system has a return valve (47), which is located in a return branch that runs parallel to a blowing pressure valve (44, 45), and that a valve outlet (50) of the return valve (47) is connected to the low-pressure supply system, wherein the return valve (47) is connected in parallel with a vent valve (51) and in series with a check valve (48), the return valve (47) also being connected to a rotary bushing (58) via an intermediate reservoir (67), the rotary valve (58) coupling a stationary part of the blowing machine to the blowing wheel (25).

11. A device in accordance with claim 10, wherein at least one pressure sensor (60) is mounted in the area of the low-pressure supply system.

12. A device in accordance with claim 10, wherein at least one of the valves (44, 45, 47) is connected to a control unit (46) for controlling the valve or valves as a function of the measuring signal of the pressure sensor (60).

13. A device in accordance with claim 10, wherein the high-pressure supply system has an operating pressure of about 40 bars.

14. A device in accordance with claim 10, wherein the low-pressure supply system has an operating pressure of about 20 bars.

15. A device in accordance with claim 10, wherein the low-pressure supply system is connected to a plant air supply system via a control unit (50) for the purpose of returning compressed air to the plant air supply system.

16. A device in accordance with claim 10, wherein the plant air supply system has an operating pressure of about 10 bars.

17. A device in accordance with claim 10, wherein the low-pressure supply system is connected to a precompression stage of a high-pressure compressor (40) via a control unit (45) for the purpose of returning compressed air to the high-pressure compressor (40).

18. A device in accordance with claim 10, wherein at least one tank (42) is installed in the low-pressure supply system for storing low-pressure air.

19. A device in accordance with claim 10, wherein at least one pressure reducing element is installed on the blowing wheel (25) for supplying a second pressure that is different from the high pressure.

20. A device in accordance with claim 10, wherein the return valve (47) is connected via an intermediate reservoir (67) with an inlet of a pressure converter (61) for the low-pressure supply system.

* * * * *